F. L. DODGSON.
SELECTIVE RELAY.
APPLICATION FILED FEB. 2, 1917.
Reissued Mar. 26, 1918. 14,446.
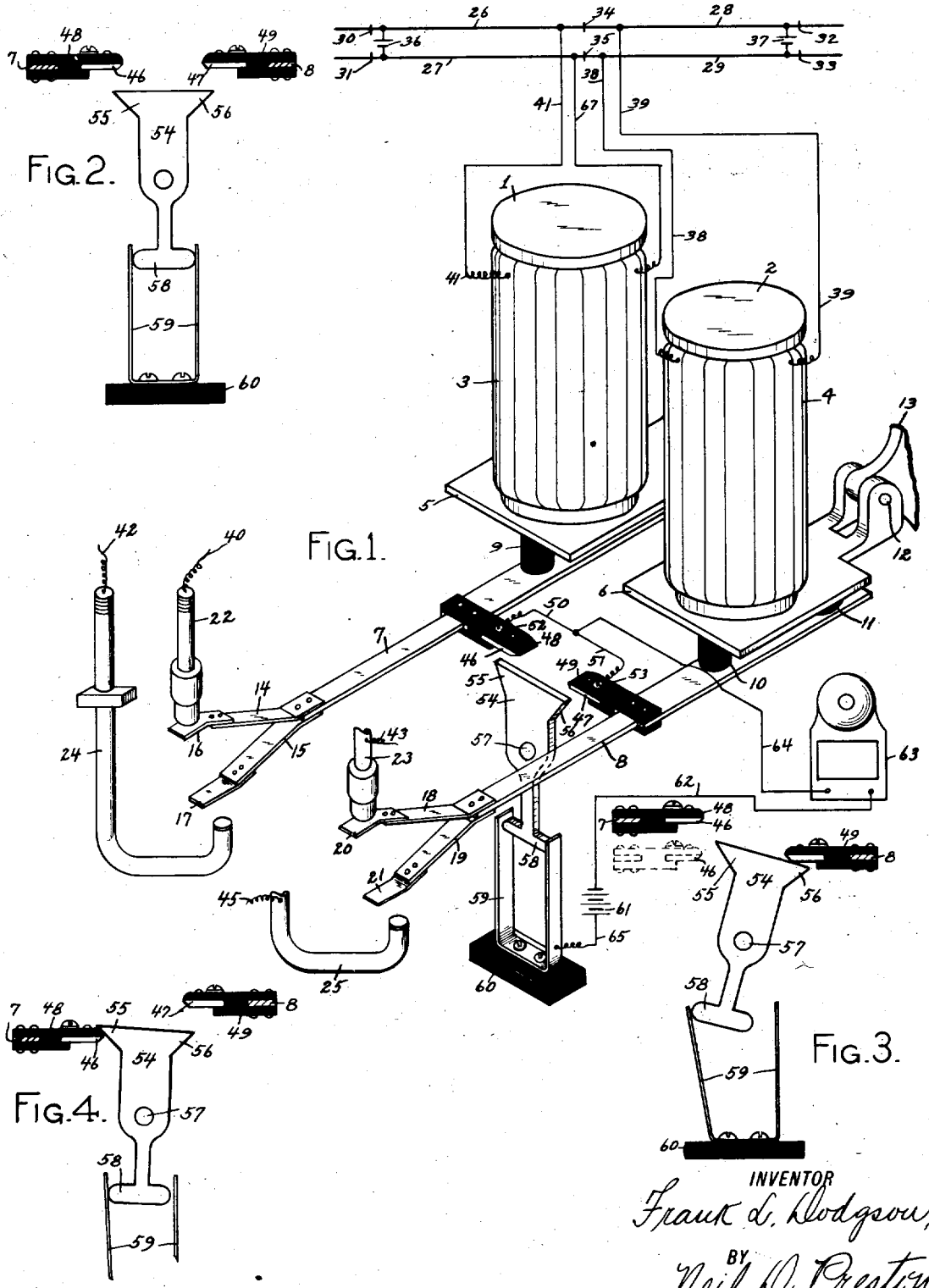
INVENTOR
Frank L. Dodgson,
BY
Neil W. Preston
ATTORNEY

UNITED STATES PATENT OFFICE.

FRANK L. DODGSON, OF ROCHESTER, NEW YORK, ASSIGNOR TO GENERAL RAILWAY SIGNAL COMPANY, OF GATES, NEW YORK, A CORPORATION OF NEW YORK.

SELECTIVE RELAY.

14,446. Specification of Reissued Letters Patent. Reissued Mar. 26, 1918.

Original No. 1,179,293, dated April 11, 1916, Serial No. 873,193, filed November 20, 1914. Application for reissue filed February 2, 1917. Serial No. 146,282.

*To all whom it may concern:*

Be it known that I, FRANK L. DODGSON, a citizen of the United States, and a resident of the city of Rochester, in the county of Monroe and State of New York, have invented a new and useful Selective Relay, of which the following is a specification.

This invention relates to a selective relay particularly applicable for controlling a highway crossing signal, together with other signals, such as block signals and approach indicators.

It is often required to control a signal, such as a bell, a lamp, or a semaphore located on a highway which crosses a railroad track at grade. Such crossing signals are usually controlled by relays controlled by the passage of trains. When such signals are controlled from a track on which the traffic moves in both directions, it is necessary that they be operated by trains approaching from either direction when the trains are a certain distance from the highway, and it is advisable that they be discontinued as the train which causes them to operate passes the highway. It is the usual practice on single track railroads to operate such signals by means of two adjoining insulated sections of track, each extending about two thousand feet, one on either side of the highway. An interlocking relay controlled by these sections is generally used to directly control the operation of the signal. This device consists of two separate relays arranged so the operation of one relay mechanically or electrically governs the operation of the other. The operating coils of each relay are each connected in bridge across the rails of one of the insulated sections at the highway end of the sections. At the other end of each of the sections a battery is connected across the rails, so that the relays are normally energized. As a train approaches the highway it moves on to the battery end of a section, thus causing the relay connected to that section to be shunted by the circuit of low resistance established through the wheels and axles of the train. The relay is thus deënergized and operates by a dropping of its armature to close a circuit and thus cause the operation of the highway crossing signal. The signal continues just so long as any part of the train is on the section. When the head end of the train moves onto the section on the other side of the highway the relay connected to that section also becomes deënergized. When the rear end of the train clears the first section entered the relay that operated first becomes energized and the other relay remains deënergized, and the signal is discontinued notwithstanding the fact that the second relay to become deënergized remains deënergized, and also notwithstanding the fact that if the train had approached the highway from the opposite direction the second relay above mentioned would have been the first to become deënergized, and would in such case have operated the signal. This same mode of operation results if a train approaches the crossing from either direction. The desired result is, therefore, effected when trains pass in either direction, and is accomplished as a result of the interlocking of the two relays. Various schemes have been proposed to accomplish this result, and most of them consist of a complicated arrangement of pawls or similar devices which prevent the relay which is the last to become deënergized from completing the circuit through the crossing signal. These relays, due to their mechanical features, are subject to certain failures which are undesirable. Furthermore, the track sections which are used to control the crossing signals are often used to control block signals or approach indicators, and it is furthermore, for the sake of economy, desirable to accomplish such control through the contacts of the interlocking relay, but the construction of these interlocking relays is such that they cannot be used for this purpose, because the armature of the second relay to become deënergized is prevented from falling through the same distance it would have fallen if it had been the first to become deënergized, consequently it does not touch the so-called "back contact," and so complete a circuit for governing the block signals or approach indicators, and even if it did touch the back contact it would not bear forcibly enough thereon to form a proper contact because it would be partially supported by the interlocking mechanism governed by the armature of the other relay.

The primary object of this invention is the production of a device which, when connected to the track circuit sections to which the ordinary interlocking relay is connected for controlling a highway crossing signal, will perform not only the functions which are now performed by the ordinary interlocking relay, but others which the interlocking relay does not now perform.

Other objects and advantages will appear as the description of the invention progresses and the novel features of the invention will be particularly pointed out in the appended claims.

In describing the invention in detail, reference will be had to the accompanying drawing, on which like characters of reference refer to like parts, and in which applicant has shown a preferred form of mechanism embodying the principle of his invention, and in which:

Figure 1 shows diagrammatically, a perspective view of a selective relay, electrical circuits through the rails of a trackway and the circuit controlling a highway crossing signal. Fig. 2, shows in their normal positions the parts of Fig. 1 which are required to control the circuit through the crossing signal. Fig. 3, shows the same parts when one relay coil is energized and the other deenergized. Fig. 4, shows the same parts when the first relay coil to become deënergized is again energized and the other relay coil remains deënergized.

Applicant has embodied the principle of his invention in a relay controlling the operation of a highway crossing signal as shown in Fig. 1 in which 1 and 2 indicate iron cores on which coils of wire 3 and 4 respectively are wound. An armature 5 is attracted by the core 1 when an electric current flows through the coil 3 and an armature 6 is attracted by core 2 when an electric current flows through coil 4. Arms 7 and 8 are rigidly but insulatingly attached to the armatures 5 and 6 respectively. Blocks 9 of insulating material secure the arm 7 to the armature 5 and blocks 10 and 11 of insulating material secure the arm 8 to the armature 6. The armatures 5 and 6 are pivotally supported by being journaled on pins as 12, which are supported by brackets as 13. Contact springs 14 and 15 are attached to the arm 7 in any suitable manner as by riveting as shown, and on the outer ends of the contact springs 14 and 15, contactors 16 and 17 are likewise attached. Contact springs 18 and 19 are riveted to the arm 8 and contactors 20 and 21 are riveted to the outer ends of the contact springs 18 and 19.

An upper contact post 22 is permanently located so it makes electrical contact with contactor 16 when the contactor is raised by the movement of armature 5 due to the energization of coil 3. An upper contact post 23 is similarly located with reference to contactor 20 and makes contact therewith when the coil 4 is energized. Lower contact post 24 is permanently located and makes contact with contactor 17 when the coil 3 becomes deënergized and allows armature 5, arm 7, contact springs 14 and 15 and contactors 16 and 17 by the action of gravity, to drop until arrested and held by contactor 17 coming in contact with the lower contact post 24, which movement also causes contactor 16 to break contact with the upper contact post 22. In like manner lower contact post 25 is located so it makes contact with contactor 21 when contactor 20 breaks contact with the upper contact post 23 when coil 4 becomes deënergized.

The mechanisms so far described are in substance two separate electrical relays which may be controlled independently from two adjoining insulated sections of the rails of the track. 26 and 27 indicate the two rails in one section of track and 28 and 29 indicate the two rails in the adjoining section. These two sections are insulated from each other by insulating rail joints 34 and 35, and are insulated from the other adjacent sections by insulating joints 30, 31, 32 and 33. The insulating joints 34 and 35 are located at or near the highway. Battery 36 has one pole connected to rail 26 and its other pole to rail 27, and battery 37 has one pole connected to rail 28 and its other pole to rail 29.

The normally closed circuit of the relay coil 3 is as follows: battery 36, rail 26, wire 41, coil 3, wire 67, and rail 27 back to battery 36. The circuit for relay coil 4 is as follows: battery 37, rail 28, wire 39, coil 4, wire 38, and rail 29 back to the battery 37. If a train moves on to rails 26 and 27 the current flows from battery 36 through rail 26, through the wheels and axles of the train to rail 27 and thence back to the battery 36, thus shunting coil 3 and deënergizing it. In like manner coil 4 is deënergized when a train moves onto the rails 28 and 29.

A metal plate 46 is rigidly secured to arm 7 by an insulating block 48 and metal plate 47 is rigidly connected to arm 8 by insulating block 49. Wire 50 is electrically connected to the plate 46 in any appropriate manner as by a screw 52, and wire 51 is likewise connected to plate 47 by screw 53. A metal sector 54 positioned beneath plates 46 and 47 and journaled on pin 57, is normally held in the position shown in Fig. 1 and Fig. 2 by the action of a two arm spring 59, which is rigidly secured to an insulating support 60. A lower projection 58 of sector 54 is shaped so the two upright portions of spring 59 normally come in contact with the sides of the projection 58. When the sector is caused to turn in either direction one of the upright portions of spring 59 exerts a pressure on the side of projection 58 as shown in Fig. 3 and Fig. 4 tending to cause the sector to return to its normal position. When coil 3 is energized and the coil 4 becomes deënergized, plate 47 is caused by gravity, to move down so as to come in contact with the top edge of sector 54 on one side of a vertical center line through pin 57 causing sector 54 to turn in a clockwise direction on pin 57 until the movement is arrested by contactor 21 coming in contact with back contact post 25, at which moment the plate 47 and sector 54 are in the position shown in Fig. 3. When the sector is held in this position and the coil 3 becomes deënergized, and the relay armature 5 operates by gravity, plate 46 will move to the position shown in dotted lines in Fig. 3, but without coming in contact with sector 54. In like manner plate 46 may be brought in contact with sector 54, when coil 3 becomes deënergized, and coil 4 is energized, causing sector 54 to be so positioned that the relay armature 6 may fall without coming in contact with sector 54.

If after the relay coil controlled by current from battery 37, becomes deënergized, causing sector 54 to move into the position shown in Fig. 3, the relay coil controlled by current from battery 36 becomes deënergized so that the plate 46 and the insulated block 48 take the positions shown in dotted lines in Fig. 3, then if the relay coil controlled by current from the battery 37 becomes energized, sector 54 is released by plate 47 and spring 59 causes sector 54 to turn toward its normal position. The sector cannot, however, reach its normal position because its motion is arrested by the corner 55 of the sector coming in contact with the insulated block 48, as shown in Fig. 4. When the relay controlled by current from battery 36 is then energized, insulated block 48 and plate 46 are raised, allowing sector 54 to return to its normal position, the beveled undercut edges of the corner 55 allowing the sector to be pushed aside without restricting the free upward movement of the arm 7.

When a train approaches the highway located say at the insulating joints 34 and 35, and runs on to rails 28 and 29 the relay coil under the control of this section of track is deënergized, and a circuit through the crossing signal is established as follows: battery 61, wire 62, signal 63, wire 64, wire 51, plate 47, sector 54, spring 59 and wire 65 back to the battery. Current flowing in this circuit causes the operation of the signal. When the head end of the same train runs onto the rails 26 and 27, the relay coil connected to these rails becomes deënergized, and plate 46 falls but does not come in contact with the sector 54 because it is not in proper position. The signal, however, continues to operate until all of the wheels of the train have moved off of rails 28 and 29, thereby allowing the relay coil connected to these rails to become energized, so that plate 47 breaks contact with the sector 54, interrupting the signal circuit, and stopping the signal. When the train has passed off of the rails 26 and 27 both relay armatures assume their normal positions. If an approaching train first runs onto rails 26 and 27, the relay coil connected to these rails becomes deënergized and a circuit is established through the crossing signal by plate 46 coming in contact with sector 54.

It is evident with trains moving in either direction the signal will operate as long as the relay coil which was first to become deënergized, remains deënergized, regardless of whether the other relay coil is deënergized or not, and as soon as the relay first to become deënergized again becomes energized the operation of the signal will be discontinued, whether the other relay coil is deënergized or energized. When the train has entirely cleared the insulated sections the relay coils both become energized.

The energization and deënergization of coils 3 and 4 not only governs the signal 63 in the manner described, but also governs the contactors 16, 17, 20 and 21 in the ordinary and well known manner, so that any desired circuits may be controlled through their instrumentality. It being merely necessary to connect one terminal of the circuit to be controlled to the contactor and the other to either one or the other of the fixed contact posts, according to whether or not it is desired to have the controlled circuit opened or closed when the relay is energized. It is well known to those skilled in the railway signaling art how the contactors 16, 17, 20 and 21 and the posts 22, 23, 24 and 25, may be used to control the apparatuses used in railway signaling and therefore no explanation is needed.

Although I have particularly described the construction of one physical embodiment of my invention, and explained the operation and principle thereof; nevertheless, I desire to have it understood that the form selected is merely illustrative, but does not exhaust the possible physical embodiments of the idea of means underlying my invention.

What I claim as new and desire to secure by Letters Patent of the United States, is:

1. A selective relay comprising two electromagnets having independently movable armatures; an arm attached to each armature, said arms being arranged side by side and moving in substantially vertical parallel planes; a movable contact member of electrical conducting material pivotally supported on a fixed horizontal pivot between said arms and capable of movement in either direction from a middle position; a member of insulating material secured to each arm and extending laterally therefrom toward the other arm, a metallic conducting piece attached to the under face of each member, each contact piece being arranged to touch the contact member when the corresponding arm drops from its uppermost position while said contact member is in its middle position, whereby the dropping of either arm establishes an electrical connection between the corresponding contact piece and said contact member and also moves said contact member out of the path of movement of the contact piece associated with the other arm; and means tending to return said contact member to its middle position after displacement thereof.

2. A selective relay comprising two electromagnets having independently movable arms adapted to be actuated thereby, said arms being arranged side by side and moving in parallel vertical planes; a block of insulating material secured to each arm and extending laterally therefrom toward the other arm; a metallic contact piece attached to the under face of each block; an oscillatable contact member of electrical conducting material pivotally mounted on a fixed horizontal pivot between said arms, said contact member having undercut beveled side edges near its upper end and being capable of oscillation in either direction from a middle position, the dropping of either arm by the deënergization of either electromagnet causing an electrical connection to be established between the corresponding contact piece and said contact member and also moving said contact member out of the path of movement of the contact piece of the other arm; said blocks of insulating material coöperating with the undercut edges of the contact member upon return upward movement of the corresponding arm to move the contact member aside to permit full return movement of said arm; and yieldable means tending to hold said contact member in its middle position.

3. A selective relay comprising two electromagnets; an arm associated with each electromagnet and arranged to be actuated thereby; an oscillatable contact member pivotally mounted on a fixed pivot and capable of movement in either direction from a middle position; a contact piece secured to each arm and arranged to coact with said contact member, the dropping of either arm causing said contact member to be moved out of the path of movement of the contact piece of the other arm; and means for restoring said contact member to its middle position, said means including parts arranged to press in opposite directions against said contact member and adapted upon movement of said contact member in either direction from its middle position to cause the corresponding one of these parts to exert a restoring force in the opposite direction.

4. A selective relay comprising two electromagnets having independently movable armatures; an arm secured to each armature, said arms being arranged side by side and moving in parallel vertical planes; a block of insulating material secured to each arm and extending laterally therefrom toward the other arm; a metallic contact piece secured to the under face of each block; an oscillatable contact member of electrical conducting material pivotally mounted in position to be engaged by the contact piece of either arm upon the dropping of that arm, the dropping of either arm moving the contact member out of the path of movement of the contact piece of the other arm; means for restoring said contact member to its middle position after displacement thereof; fixed contacts arranged to coöperate with said arms in their different positions, thereby controlling circuits independently of the contact pieces and the contact member; and flexible electrical connections leading to said contact pieces and to said contact member.

5. A selective relay comprising two electromagnets; an arm associated with each electromagnet and adapted to be actuated thereby, said arms being arranged side by side and being biased by their own weight to move downward in substantially vertical parallel planes; a contact piece secured to and insulated from each arm and extending laterally therefrom toward the other arm; an oscillatable contact member supported between said arms in position to be engaged by the contact piece of either arm upon downward movement of that arm, the downward movement of either arm moving said contact member out of the path of movement of the contact piece of the other arm; and means for restoring said contact member to its initial position after oscillation thereof in either direction.

6. A selective relay comprising two electromagnets; independently movable arms associated with said electromagnets and operated thereby; an oscillatable contact member of electrical conducting material; means for restoring said contact member to its middle position after displacement thereof, said means including parts adapted to be separately rendered effective to exert a force tending to move said contact member back to its middle position when it is moved from its middle position in the corresponding direction; and contacting means associated with each arm and adapted to coact with said contact member, said contacting means establishing an electrical connection with said contact member upon engagement therewith upon downward movement of the corresponding arm, but not upon upward movement of the corresponding arm.

7. A selective relay comprising two electromagnets; independently movable arms associated with said electromagnets and operated thereby, said arms being arranged side by side to move vertically; a block of insulating material secured to each arm and extending laterally toward the other arm; a metallic contact piece secured to the under face of each block; an oscillatable contact member of electrically conducting material pivotally mounted between said arms in position to be engaged by the contact piece of either arm upon downward movement of that arm, the dropping of either arm moving the contact member out of the path of movement of the contact piece of the other arm; means for restoring said contact member to its initial position after oscillation thereof in either direction; and fixed contacts arranged to coöperate with said arms in their different positions, thereby controlling circuits independently of the contact member and the contact pieces of said arms.

FRANK L. DODGSON.